(12) United States Patent
Jayakumaran

(10) Patent No.: US 7,108,252 B2
(45) Date of Patent: Sep. 19, 2006

(54) METHOD AND APPARATUS FOR REDUCING FORCE TRANSMITTED FROM A BASE STRUCTURE TO A SUPPORTED STRUCTURE

(75) Inventor: Sujay Jayakumaran, Bangalore, IN (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 373 days.

(21) Appl. No.: 10/063,030

(22) Filed: Mar. 13, 2002

(65) Prior Publication Data

US 2003/0173724 A1   Sep. 18, 2003

(51) Int. Cl.
 *F16F 3/02* (2006.01)
 *F16M 1/00* (2006.01)
(52) U.S. Cl. .................. 267/151; 267/236; 267/153
(58) Field of Classification Search ................ 267/136, 267/151, 152, 153, 145, 292, 279
See application file for complete search history.

(56) References Cited

U.S. PATENT DOCUMENTS

| | | | | |
|---|---|---|---|---|
| 1,887,310 A | * | 11/1932 | King et al. ................. | 267/145 |
| 3,003,738 A | * | 10/1961 | Horovitz ................... | 267/141.1 |
| 3,109,639 A | * | 11/1963 | Nicolaisen ................. | 267/153 |
| 4,267,792 A | * | 5/1981 | Kimura et al. ............. | 114/219 |
| 4,269,400 A | | 5/1981 | Jensen | |
| 4,535,553 A | * | 8/1985 | Derderian et al. .......... | 36/28 |
| 4,783,038 A | | 11/1988 | Gilbert et al. | |
| 5,149,066 A | | 9/1992 | Snaith et al. | |
| 5,280,890 A | * | 1/1994 | Wydra ....................... | 267/220 |
| 5,588,165 A | * | 12/1996 | Fromme ..................... | 5/247 |
| 5,632,473 A | * | 5/1997 | Dias Magalhaes Queiroz ................. | 267/164 |
| 5,808,866 A | | 9/1998 | Porter | |

\* cited by examiner

*Primary Examiner*—Xuan Lan Nguyen
(74) *Attorney, Agent, or Firm*—McAndrews, Held & Malloy, Ltd.; Peter J. Vogel; Michael A. Dellapenna

(57) ABSTRACT

A method and apparatus are disclosed for reducing transmission of force from a base structure to a supported structure. The method includes mounting a plurality of dampers between the base structure and the supported structure. Each damper includes a single damping element having at least two contact arms affixed to either the base structure or the supported structure. Damping of forces is achieved by each damper in multiple orthogonal directions. The base structure is mounted to a transportation vehicle. The supported structure includes equipment mounted on a floating platform.

3 Claims, 5 Drawing Sheets

METHOD AND APPARATUS FOR REDUCING FORCE TRANSMITTED FROM A BASE STRUCTURE TO A SUPPORTED STRUCTURE

BACKGROUND OF THE INVENTION

Certain embodiments of the present invention relate to reducing forces transmitted from one structure to another. More particularly, certain embodiments of the present invention relate to reducing forces transmitted to a diagnostic medical system during shipment.

Diagnostic medical systems, such as a diagnostic X-ray system having a large C-arm, are complex, large, heavy, and expensive systems that need to be protected from damage due to shock and vibration during shipment. Units are typically shipped all around the world in vehicles experiencing various road conditions.

Various packaging systems and methods have been used in shipping medical systems. For example, one method includes mounting the medical system directly onto a wooden base with the chassis of the system elevated and supported on wooden strips. Another method includes sandwiching expanded polyurethane (EP) foam between two layers of plywood and mounting the system on the top layer. The two methods typically do not provide the required isolation from shock and vibration. Other methods include using a high-density polyethylene (HDPE) pallet with the system mounted on the pallet. The tooling cost and per unit production cost of the HDPE pallet often prove to be prohibitive, however.

Some methods include using relatively sophisticated isolators incorporated into relatively sophisticated configurations. For example, a method described in U.S. Pat. No. 5,808,866 to Porter describes having isolators mounted between a case and a card cage within the case. U.S. Pat. No. 5,149,066 Snaith, et al. describes an isolator having a plurality of arched elements arranged circumferentially about an axis between two structures. U.S. Pat. No. 4,269,400 to Jensen describes an isolator having a plurality of concentrically-arranged, nested, bell-shaped components stacked in parallel about a common axis. U.S. Pat. No. 4,783,038 to Gilbert, et al. describes an isolator with flexural support element pairs being located and offset in planes at acute angles from the horizontal defined by a base means.

The methods and systems described above tend to be complex, expensive, and/or inadequate for reducing shock and vibration. For example, the isolators described above have multiple damping elements arranged in complex configurations.

A need exists for a simple damper with a single damping element capable of providing resistance to shock and vibration forces in multiple orthogonal spatial directions. A need also exists for a relatively simple packaging system that uses a plurality of the simple dampers in a simple configuration.

SUMMARY OF INVENTION

An embodiment of the present invention provides for a packaging system for reducing transmission of force from a base platform to a floating platform by employing a plurality of dampers mounted between the base platform and the floating platform. The dampers each comprise a single damping element having at least two contact arms affixed to either the base platform or the floating platform. A plurality of side panels attach to the base platform to enclose equipment that is mounted to the floating platform.

Apparatus is provided for reducing transmission of force from a base structure to a supported structure. The apparatus comprises a single damping element having at least two contact arms affixed to either the base structure or the supported structure. An affixing base plate is mounted between the damping element and the base structure and an affixing offset plate is mounted between the damping element and the supported structure. The single damping element provides resistance to force in multiple orthogonal spatial directions.

A method is also provided for reducing transmission of force from a base structure to a supported structure. The method includes mounting a plurality of dampers between the base structure and the supported structure. The dampers each include a single damping element having at least two contact arms affixed to either the base structure or the supported structure. The base structure is mounted to a transportation vehicle. The supported structure includes a diagnostic medical system mounted on a floating platform.

Certain embodiments of the present invention afford an approach to providing resistance to shock and vibration forces in multiple orthogonal spatial directions using simple dampers each having a single damping element. Certain embodiments also provide for a relatively simple packaging system that uses a plurality of the simple dampers in a simple configuration.

The foregoing summary, as well as the following detailed description of certain embodiments of the present invention, will be better understood when read in conjunction with the appended drawings. It should be understood, however, that the present invention is not limited to the arrangements and instrumentality shown in the attached drawings.

DETAILED DESCRIPTION

Figure 1:
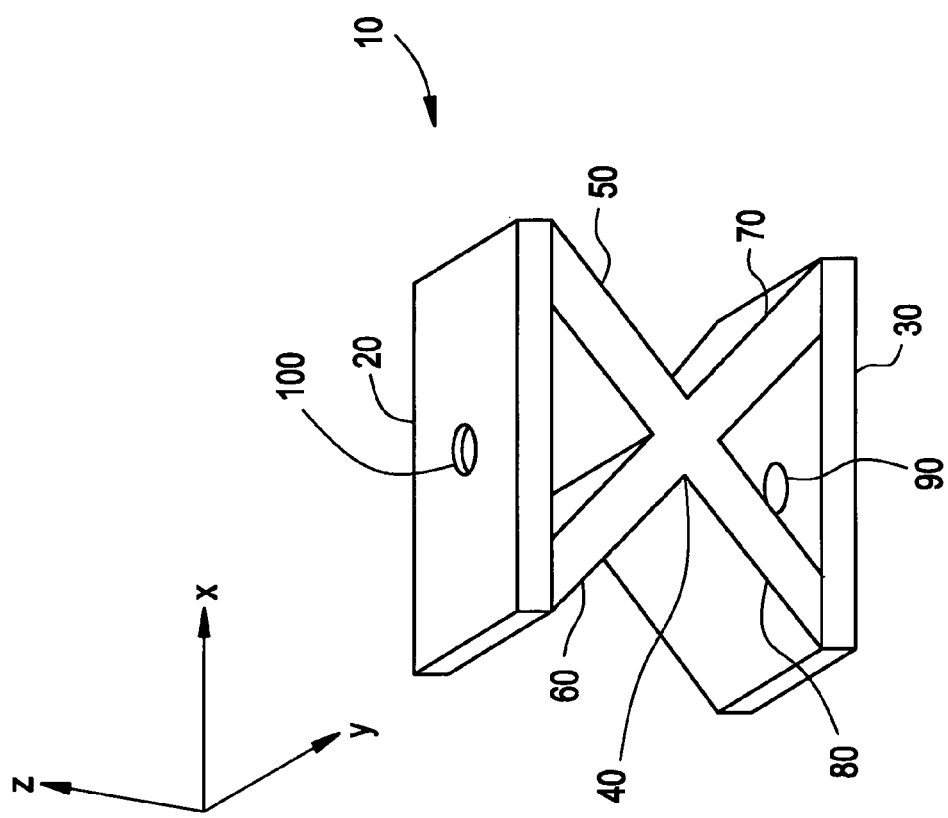
FIG. 1 is an isometric drawing of a damper having a single damping element in accordance with an embodiment of the present invention.

FIG. 1 is an isometric view of a damper 10 showing certain elements of the damper 10 in accordance with one embodiment of the present invention. The damper 10 comprises a base plate 30, an offset plate 20, and a single damping element 40. The single damping element 40 is a single molded piece of rubber having four contact arms 50, 60, 70, 80 forming a three-dimensional X shape in one embodiment of the present invention.

The two lower contact arms 70 and 80 connect to the base plate 30 and the two upper contact arms 50 and 60 connect to the offset plate 20. The base plate 30 and the offset plate 20 are made of steel in one embodiment of the present invention. A chemical bonding process may be used to bond the contact arms 50–80 of the rubber damping element 40 to the steel base plate 30 and steel offset plate 20.

The base plate 30 and the offset plate 20 each have a through-hole 90 and 100, respectively. The through-holes 90 and 100 may be used to bolt the damper 10 between a base platform and a floating platform of a packaging system. When mounted between two platforms, the damper 10 reduces transmission of shock and vibration forces in all three orthogonal spatial directions x, y, and z as shown in FIG. 1.

The rubber contact arms 50–80 of the damping element 40 allow the transmission of force to be reduced from the base plate 30 to the offset plate 20 by flexing when force is applied to the base plate from an external source. The X-shape and the rubber material of the damping element 40 provide flexure between the base plate 30 and offset plate 20 in all three spatial directions x, y, and z. The density and thickness of the rubber material of the damping element 40 determine the amount of flexure (resistance to force) provided by a single damper 10.

Some typical specifications that are met by the X-damper design are shown in Table 1. The packaging system is designed such that the permissible shock values are limited within that shown in Table 1. Shock values that exceed the specifications are damped by the packaging system. The specifications in Table 1 are representative of the shock forces permissible, as per the GMTC (Global Mechanical Technology Center) standards, by the equipment within the packaging system when on a truck making a 2000 km trip.

TABLE 1

½ sine wave shock pulses (representing a 2000 Km trip by truck)

| Duration (Milliseconds) | Amplitude (m/s$^2$) [g] | Number of Occurrences |
|---|---|---|
| 7.5 | 96.1 [9.8] | 324 |
| 12.5 | 39.2 [4.0] | 216 |
| 17.5 | 32.4 [3.3] | 162 |
| 22.5 | 25.5 [2.6] | 135 |
| 27.5 | 16.7 [1.7] | 81 |

More specifically, the dimensions of one embodiment of the X-shaped damper 10 are set based on shipping a medical diagnostic X-ray system with a large C-arm and meeting the specifications of Table 1. The height of the damper along the z direction, including the base plate 30 and offset plate 20, is 100 millimeters, the length along the x direction is 110 millimeters, and the width along the y direction is 70 millimeters. The thickness of the steel base plate 30 and offset plate 20 are each 10 millimeters. The rubber material of the single damper is as follows: Specification of the rubber:

| Material: Natural Rubber (No synthetic Variables, Re- Cyclable) | |
|---|---|
| Service Temp: | 70° C. |
| Hardness: | 80 Shore A |
| Specific Gravity: | 0.83 |
| Tensile Strength: | 22 MP |

Other materials may be used for the damping element 40 to achieve various levels of flexure and, therefore, damping for various combinations of density and thickness of the other materials. Materials and dimensions of the damping element may be customized for different equipment having various weights and centers of gravity.

Figure 2:
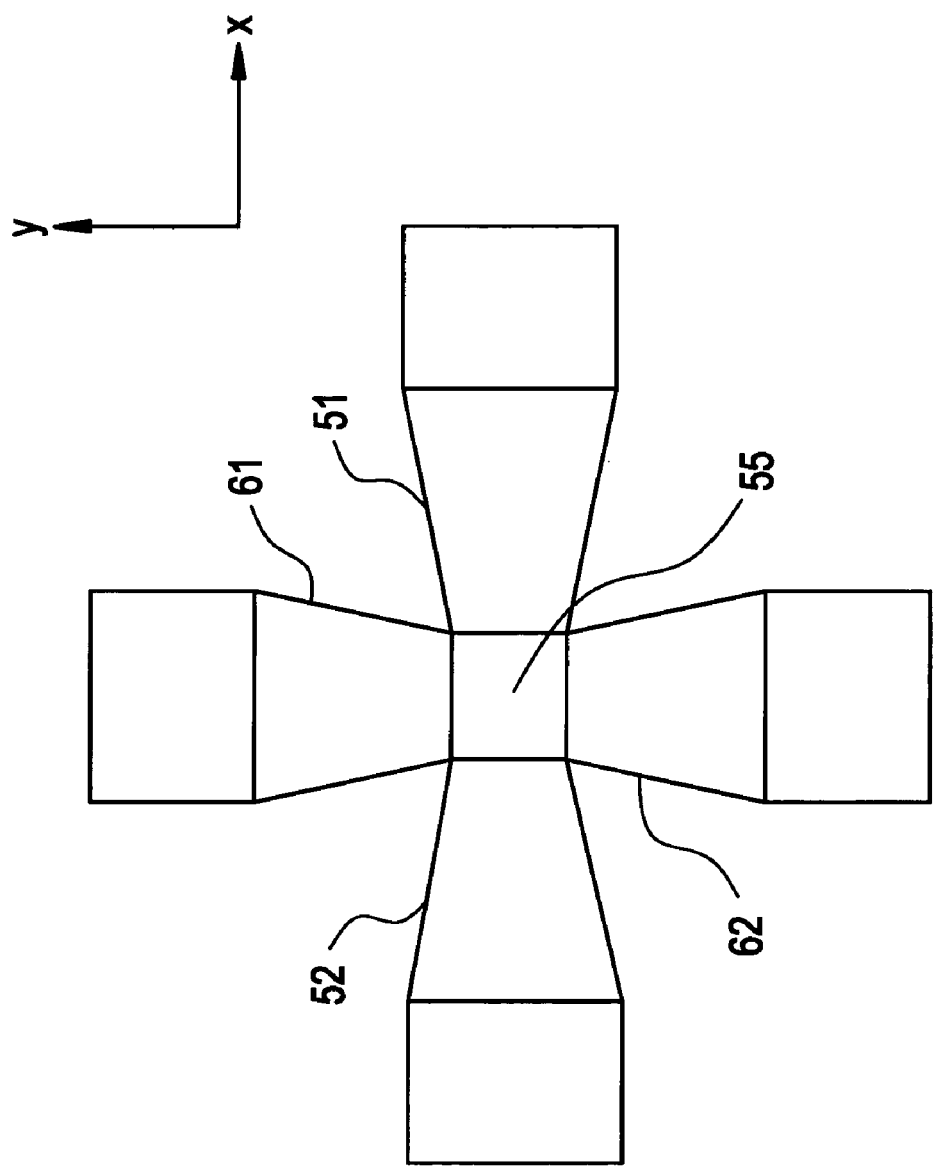
FIG. 2 is a top perspective view of a double-X damping element in accordance with an embodiment of the present invention.

The fact that the damping element 40 is a single molded piece having a relatively simple shape makes it easy to manufacture and keeps molding and per unit costs down. Of course, other shapes may be configured for the single damping element. For example, FIG. 2 shows a top view of a double-X configuration, having one X crossing orthogonally through another X, manufactured as a single piece. As a result, four contact arms 51, 52, 61, and 62 extend from above the center intersection 55 of the double-X and four contact arms (not shown) extend from below the center intersection 55 of the double-X. The double-X configuration may potentially allow more similar damping to be provided along the x and y directions.

Figure 3:
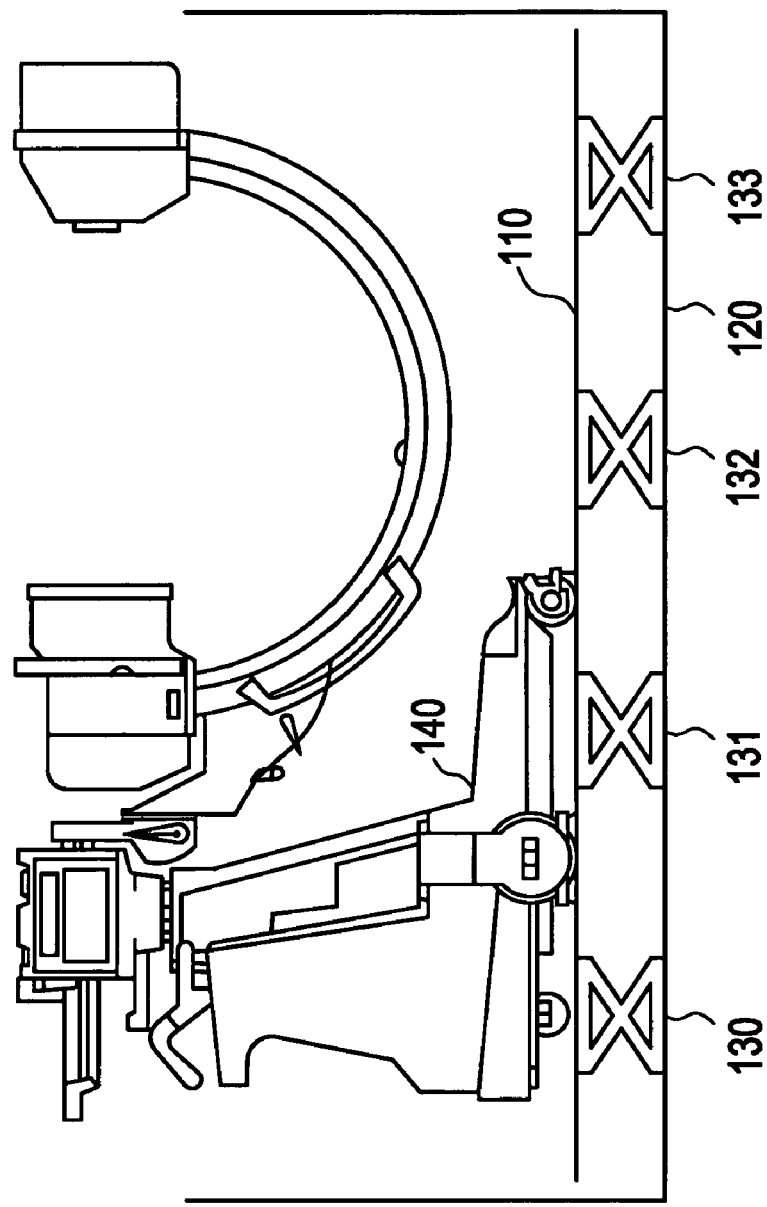
FIG. 3 illustrates the method of mounting a diagnostic medical system on a floating platform by employing a plurality of the dampers of FIG. 1 in accordance with an embodiment of the present invention.

FIG. 3 illustrates the method of mounting a diagnostic medical system on a floating platform by employing a plurality of the dampers of FIG. 1 in accordance with an embodiment of the present invention. A diagnostic medical system 140 is mounted on top of a floating platform 110. A plurality of X-shaped dampers 130–133 are shown being mounted between the floating platform 110 and the base platform 120. The dampers are typically bolted to the floating platform and base platform. Various attachment methods may be used to secure the system 140 to the floating platform 110, such as employing brackets and mounting screws, depending on the configuration of the system 140.

Figure 4B:
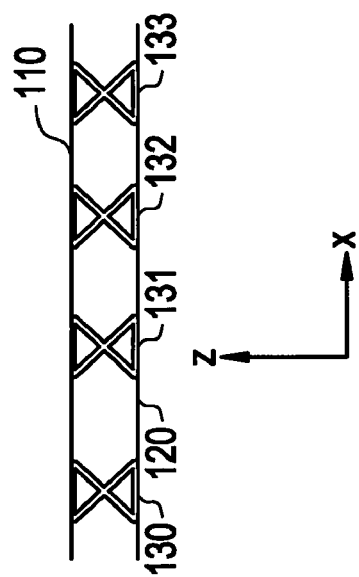
FIGS. 4a, 4b, and 4c illustrate several views of a simple configuration of a plurality of the dampers of FIG. 1 arranged between a base platform and a floating platform in accordance with an embodiment of the present invention.
Figure 4C:
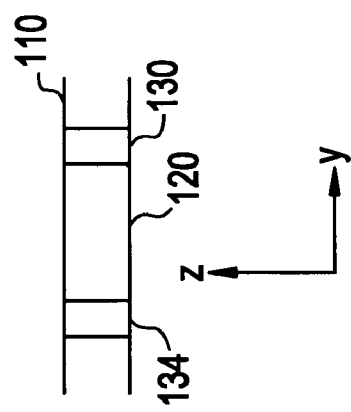
Figure 4A:
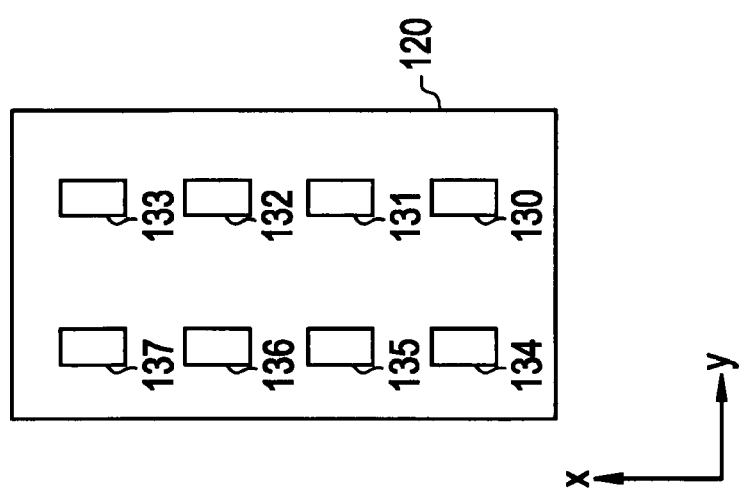

FIGS. 4a, 4b, and 4c show various views of a typical damper configuration between a base platform 120 and a floating platform 110. In this example, eight dampers 130–137 are configured in a rectangular, symmetrical pattern. The base plates of the dampers are bolted to the base platform and the offset plates of the dampers are bolted to the floating platform. Any forces that are experienced by the base platform are damped by the dampers and, therefore, the floating platform experiences less force than that experienced by the base platform. As a result, equipment that is mounted to the floating platform is protected from the full force applied to the base platform.

Figure 5:
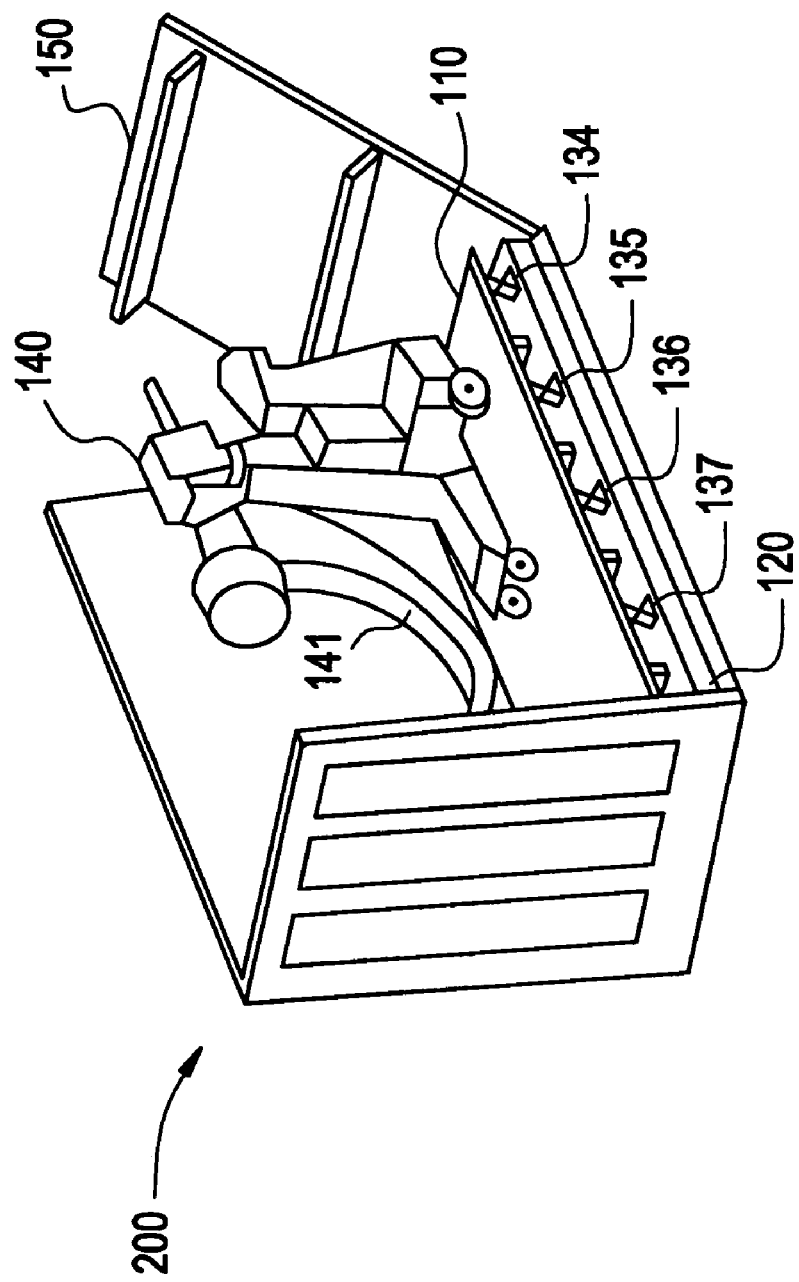
FIG. 5 illustrates a packaging system employing a plurality of the dampers of FIG. 1 in accordance with an embodiment of the present invention.

FIG. 5 is a three-dimensional view of a packaging system 200, illustrating how a diagnostic medical system 140 may be packaged using the damper concept. The medical system 140 is mounted to the floating platform 110. The dampers (134–137 are shown in this view) are mounted between the floating platform 110 and the base platform 120. Side panels 150 are mounted around the base platform 120 to enclose the medical system 140 on the floating platform 110. When the medical system 140 is shipped, the base platform 120 may be mounted to the floor of a shipping vehicle such as a truck. In one embodiment of the present invention, the specifications of Table 1 are met. When the base platform 120 experiences the g-forces expected on a 2000 Km road trip, the diagnostic medical X-ray system 140 with its large C-arm 141 may not experience shock values that exceed the specification of Table 1.

As a comparison to other methods of damping, a 70 km road test was performed for three designs. The first design uses the expanded polyurethane (EP) foam, the second design uses a HDPE pallet, and the third design uses the X-shaped dampers. During the 70 km road test, the number of force events over 1.5 g experienced by the diagnostic medical system were measured. The EP foam design experienced 16 events, the HDPE design experienced 7 events, and the X-shaped damper design experienced zero events clearly illustrating the superior damping performance of the X-shaped damper design.

As an alternative, other configurations of dampers may be used depending on the weight and center of gravity of the equipment to be shipped. For example, a circular configuration of dampers may provide better overall damping for equipment where the weight is distributed mostly along the outer perimeter of the equipment. As a further alternative, dampers of differing designs may be employed in a single shipping configuration. For example, in the rectangular configuration of FIG. 4a, dampers 130, 131, 134, and 135 may be X-shaped, and dampers 132, 133, 136, and 137 may be double-X shaped. As a result, the damping of forces experienced by the front half of the packaging system (corresponding to dampers 132, 133, 136, and 137) may be more uniform in the x and y-directions. The damping of forces experienced by the back half of the packaging system (corresponding to dampers 130, 131, 134, and 135) may be greater in the x-direction and less in the y-direction. Such a configuration may be desirable for certain types of equipment to be shipped.

In summary, the advantages and features include, among others, providing a simple damper with a single damping element capable of providing resistance to forces in multiple orthogonal spatial directions and a relatively simple packaging system that uses a plurality of the simple dampers in a simple, low cost configuration.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. Apparatus for reducing transmission of force from a base structure to a supported structure, said apparatus comprising a single damping element shaped as a three dimensional X and manufactured as a single piece, wherein said single damping element comprises at least two contact arms, each of which is separately affixed to one of an affixing base plate mounted to said base structure and an affixing offset plate mounted to a floating structure upon which said supported structure rests.

2. A packaging system for reducing transmission of force from a base platform to a floating platform, said packaging system comprising:
a base platform;
a floating platform; and
a plurality of dampers mounted between said base platform and said floating platform, wherein at least one of said plurality of dampers comprises a single damping element includes a first three-dimensional X orthogonally crossing through a second three-dimensional X manufactured and existing as a single piece, said single damping element comprising at least two contact arms each of which is separately affixed to one of a base plate mounted to said base platform and an offset plate mounted to said floating platform.

3. Apparatus for reducing transmission of force from a base structure to a supported structure, said apparatus comprising a single damping element comprising a first three-dimensional X orthogonally crossing through a second three-dimensional X manufactured as a single piece, wherein said single damping element comprises at least two contact arms, each of which is separately affixed to one of an affixing base plate mounted to said base structure and an affixing offset plate mounted to a floating structure upon which said supported structure rests.

* * * * *